(12) United States Patent
Yamanaka et al.

(10) Patent No.: US 6,201,635 B1
(45) Date of Patent: Mar. 13, 2001

(54) OPTICAL AMPLIFIER

(75) Inventors: Mikinori Yamanaka; Yuji Tamura, both of Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/248,105

(22) Filed: Feb. 11, 1999

(30) Foreign Application Priority Data

Jul. 6, 1998 (JP) .................................................. 10-190221

(51) Int. Cl.$^7$ ....................................................... H01S 3/00
(52) U.S. Cl. ......................... 359/337; 359/341; 359/160
(58) Field of Search ................................... 359/341, 160, 359/337

(56) References Cited

U.S. PATENT DOCUMENTS

| 6,025,947 | * | 2/2000 | Sugaya et al. | 359/160 |
| 6,061,171 | * | 5/2000 | Taylor et al. | 359/341 |

FOREIGN PATENT DOCUMENTS

| 0902567 | * | 3/1999 | (EP) . |
| 7-212315 |   | 8/1995 | (JP) . |

* cited by examiner

*Primary Examiner*—Mark Hellner
(74) *Attorney, Agent, or Firm*—Staas & Halsey LLP

(57) ABSTRACT

The invention relates to an optical amplifier; more particularly, the invention provides an optical amplifier that contains a front-end optical amplifier and a back-end optical amplifier, and that is equipped with an automatic compensation function for automatically detecting and compensating for signal loss caused by a dispersion compensator inserted between the front-end and back-end optical amplifiers. The optical amplifier, which contains a front-end optical amplifier 31 and a back-end optical amplifier 32, comprises: a loss detection means 36 for detecting optical signal loss occurring between the front-end optical amplifier and the back-end optical amplifier; and a gain control means 37 for compensating, based on the loss detected by the loss detection means, for a variation in optical output power of the entire optical amplifier including the front-end optical amplifier and back-end optical amplifier.

15 Claims, 16 Drawing Sheets

OUTPUT CONTROL SIGNAL

OUTPUT CONTROL SIGNAL

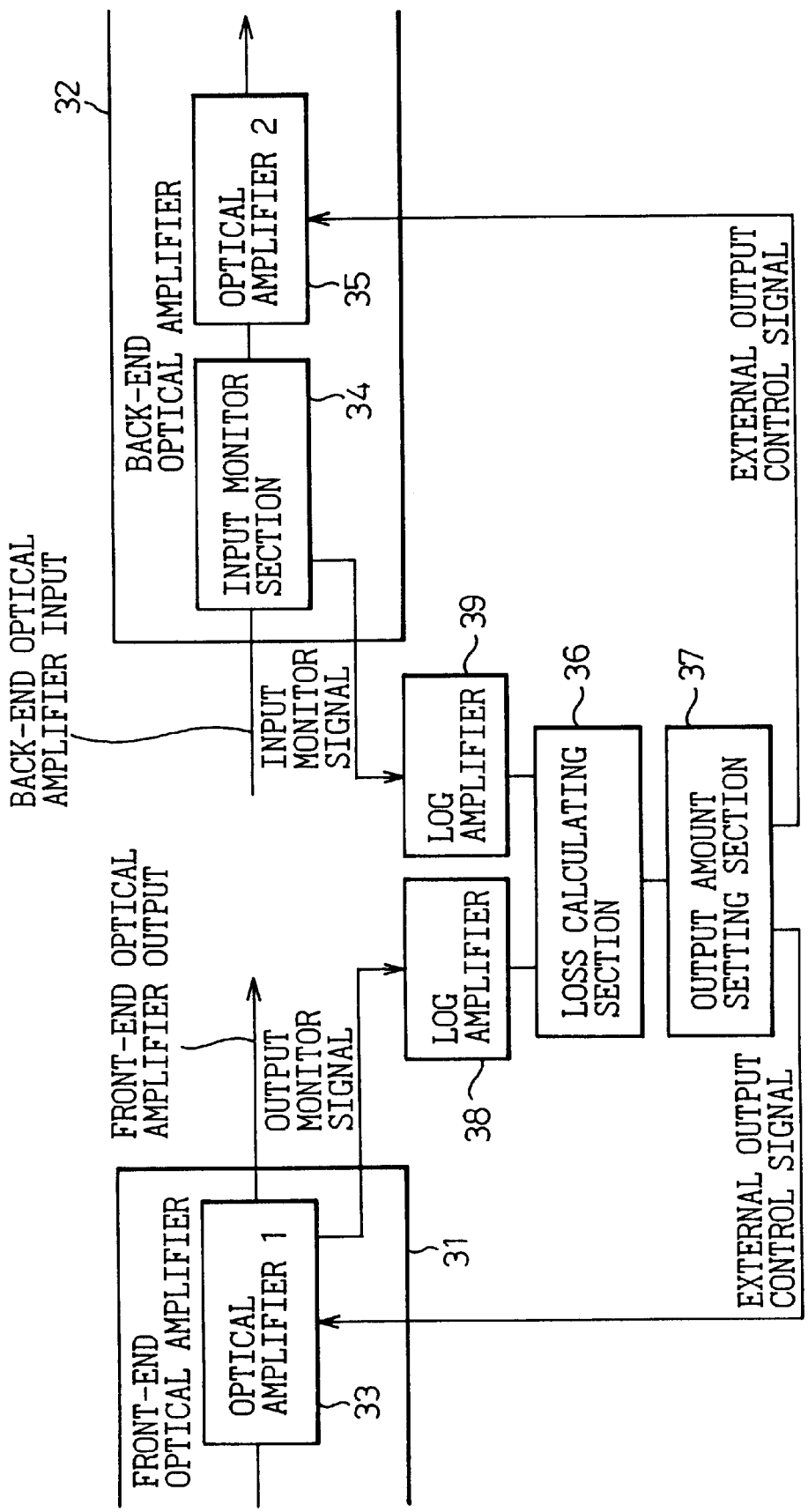

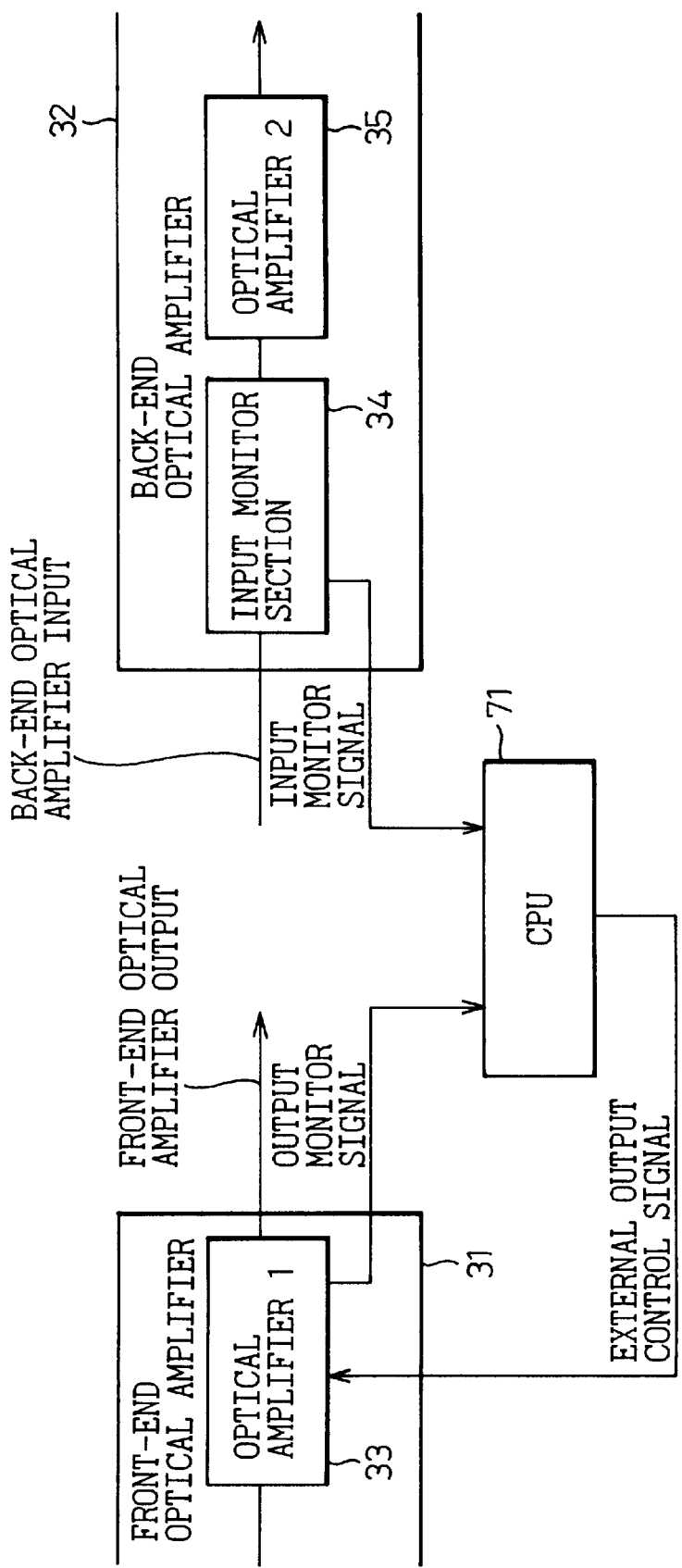

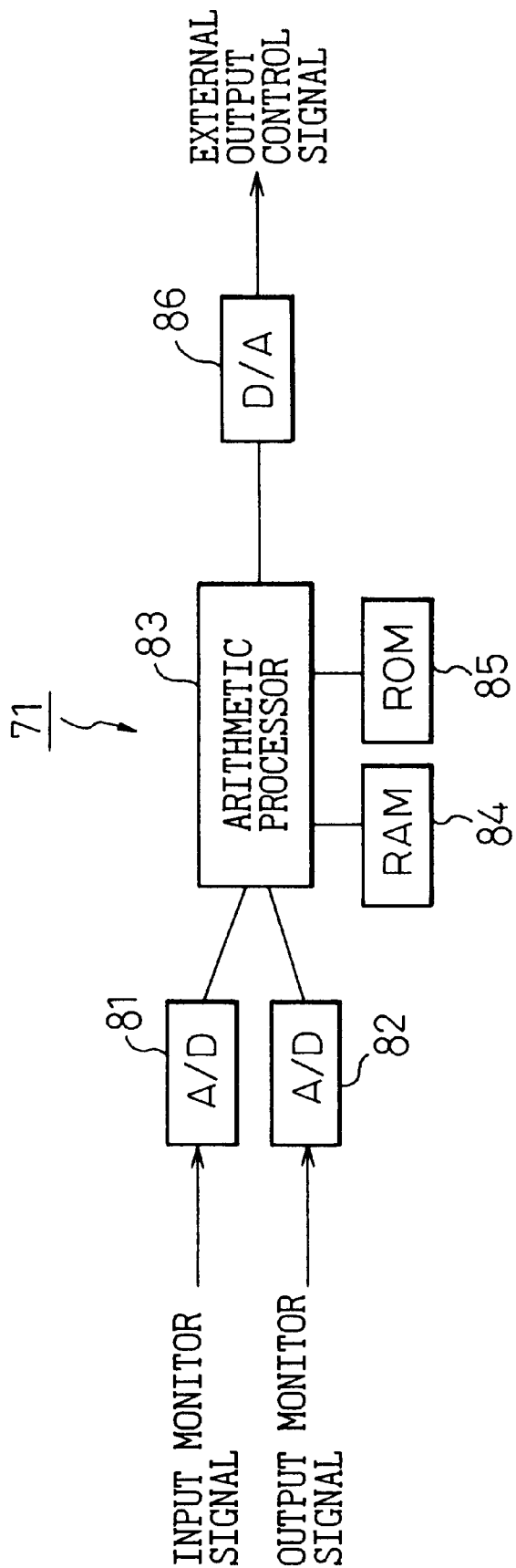

OPTICAL AMPLIFIER

BACKGROUND OF THE INVENTION

1. Field of the Invention

The present invention relates to an optical amplifier, and more particularly to an optical amplifier that contains a front-end optical amplifier and a back-end optical amplifier, and that is equipped with an automatic compensation function for automatically detecting and compensating for the loss caused by a dispersion compensator inserted between the front-end and back-end optical amplifiers.

2. Description of the Related Art

In recent years, development effort has been exerted to increase the transmission capacities and transmission distances of optical transmission systems using optical amplifiers, and systems with increased capacities and transmission distances are being deployed in practical applications. An optical amplifier using an erbium-doped fiber capable of amplifying light in the 1.55 μm range is the predominant type in use today, and an optical signal in the 1.55 μm range is used as signal light.

Most of the currently installed optical fibers are either 1.3 μm zero dispersion fiber (SMF: Single Mode Fiber) whose zero dispersion wavelength is in the 1.3 μm range or 1.55 μm zero dispersion fiber (DSF: Dispersion Shifted Fiber) whose dispersion characteristic is shifted so as to achieve zero dispersion in the 1.55 μm range. In the U.S. and Europe, 1.3 μm zero dispersion fibers have by far the largest installed base.

FIG. 1 shows dispersion characteristic examples of optical fibers.

Two dispersion characteristic examples, one for 1.3 μm zero dispersion fiber and the other for 1.5 μm zero dispersion fiber, are illustrated in FIG. 1. As shown by dashed lines in FIG. 1, the dispersion characteristic of the 1.3 μm zero dispersion fiber for light at 1.55 μm is about 17 ps/km.nm. This value indicates that when light in the 1.55 μm range is propagated through the 1.3 μm zero dispersion fiber over a distance of 1 km, a propagation time difference of 17 ps will occur at the output end for every nanometer (=0.001 μm) displacement in wavelength.

In an optical transmission system, since transmission signal light generally has a band width of about 0.2 nm or less, if a 1.55 μm optical signal having a band width of 0.1 nm, for example, was transmitted through the 1.3 μm zero dispersion fiber over a distance of 100 km, a propagation time difference or temporal signal light fluctuation of 170 ps would occur at the output end. As an example, if a 10-Gb/s signal was used as the transmission signal, since one cycle of the signal is equal to 100 ps, it is clear that reception would be rendered impossible in the event of the temporal fluctuation of 170 ps. If a lower speed transmission signal was used, on the other hand, the temporal fluctuation would degrade the transmission characteristic.

Accordingly, if signal light at 1.55 μm was transmitted through the currently most widely installed 1.3 μm zero dispersion fiber, dispersion would occur within the optical fiber, and the transmission characteristic would degrade due to the effects of the dispersion. In view of this, when installing an optical amplifier in a 1.3 μm zero dispersion fiber segment, it is practiced to insert in the segment a dispersion compensator capable of compensating for the dispersion characteristic, mostly a dispersion compensating fiber (DCF) having an inverse dispersion characteristic to that of the 1.3 μm zero dispersion fiber.

FIG. 2 is a diagram showing one example of an optical transmission system.

FIG. 3 is a diagram showing the basic configuration of a prior art optical amplifier used in the optical transmission system of FIG. 2.

FIG. 2 shows the case where signal light is transmitted from a transmitting end station 10 to a repeater station 12 through a 1.3 μm zero dispersion fiber (SMF) 11, and then from the repeater station 12 to a receiving end station 14 through a 1.55 μm zero dispersion fiber (DSF) 13. Optical amplifiers 23, 24, and 25 provided at the respective stations 10, 12, and 14 are erbium-doped fiber (EDF) amplifiers, so that signal light of 1.55 μm wavelength is used as the transmission signal light.

As shown in FIG. 3, the optical amplifiers 23, 24, and 25 are each constructed from a two-stage amplifier consisting of a front-end and a back-end amplifier, and a dispersion compensating fiber (DCF) is inserted as necessary between the front-end optical amplifier 31 and the back-end optical amplifier 32. As an example, in the case of FIG. 2, a dispersion compensating fiber is inserted in the optical amplifier 23 at the transmitting end station 10 to compensate for the dispersion that occurs in the 1.3 μm zero dispersion fiber (SMF) 11.

In the other optical amplifiers 24 and 25, the front-end optical amplifier is connected directly (through-connection) to the back-end optical amplifier. This is because the phenomenon of dispersion does not occur when the signal light of 1.55 μm wavelength is transmitted through the 1.55 μm zero dispersion fiber (DSF) 13. The front-end optical amplifier 31 and the back-end optical amplifier 32 are each constructed from an erbium-doped fiber amplifier, and optical output automatic level control (ALC) is performed for each amplifier independently of the other.

However, since the dispersion compensator has in itself an insertion loss of 3 to 10 dB, the optical amplifier gain that becomes necessary for the 1.55 μm zero dispersion fiber segment (where no dispersion compensator is installed) is different from that for the 1.3 μm zero dispersion fiber segment (where the dispersion compensator is installed). In the prior art, therefore, different kinds of optical amplifiers have been used that have different characteristics required for the respective fiber segments. This has lead to the problem of increased amplifier costs and increased expenditures for maintenance and management because of the need to install an optical amplifier that matches each different optical fiber segment.

Since there is a limit on the power that may be input to the dispersion compensating fiber connected to the front-end optical amplifier 31, the optical output power of the front-end optical amplifier 31 is controlled to within the upper limit of the above input power. One factor that limits the input power is stimulated Brillouin scattering, which imposes a limit on the input to the optical fiber. Stimulated Brillouin scattering is a nonlinear effect caused in the output power by stimulated emission when a power exceeding a threshold is coupled into an optical fiber; as a consequence, the signal waveform is distorted, degrading the transmission characteristic.

As a result, in the prior art, the optical output power has been set low also for the 1.55 μm zero dispersion fiber segment where a dispersion compensating fiber need not be connected; this has lead to the problem that the noise figure of the optical amplifier used in the 1.55 μm zero dispersion fiber segment is degraded.

An approximation equation for expressing the noise figure is given as

Noise figure=Pase /hvΔvG where Pase: ASE power at signal wavelength
h: Planck's constant
v: Frequency of signal light
Δv: Bandwidth
G: Gain As can be seen from the equation, the noise figure improves as the gain (optical output) increases.

SUMMARY OF THE INVENTION

In view of the above-enumerated problems, it is an object of the present invention to provide an optical amplifier wherein only one kind of optical amplifier is used and the optical output power of the entire optical amplifier is constantly maintained at a predetermined level by means of an automatic compensation function which automatically detects, and compensates for, signal light loss caused by a dispersion compensator inserted between the front-end and back-end amplifier stages.

According to the optical amplifier of the present invention, the output power of either the front-end or back-end amplifier or both is automatically set at an appropriate value that matches a 1.3 μm zero dispersion fiber segment or 1.5 μm zero dispersion fiber segment, whichever is applicable.

It is another object of the present invention to provide a low-noise optical amplifier with provisions made to set the output power of the front-end optical amplifier at an optimum value by considering the noise figure as well as the limiting input power to a dispersion compensating fiber. That is, when the amplifier is used for a 1.3 μm zero dispersion fiber segment (where a dispersion compensator is installed), the input power is automatically set so as not to exceed the input limit value (optical component's rated value) determined by taking into account the nonlinear effect of the dispersion compensating fiber, while when the amplifier is used in a 1.55 μm zero dispersion fiber segment (where no dispersion compensator is installed), a higher value than that for the 1.3 μm zero dispersion fiber segment is automatically set with priority given to the improvement of the noise figure.

According to the present invention, there is provided an optical amplifier containing a front-end optical amplifier and a back-end optical amplifier, and comprising a loss detection means for detecting optical signal loss occurring between the front-end optical amplifier and the back-end optical amplifier and a gain control means for compensating, based on the loss detected by the loss detection means, for a variation in optical output power of the entire optical amplifier including the front-end optical amplifier and the back-end optical amplifier.

The optical signal loss occurs due to the insertion of a dispersion compensator. A dispersion compensating fiber is used for the dispersion compensator. Compensation for the variation in optical output power of the entire optical amplifier is performed by controlling the gain of the front-end optical amplifier, and the gain control is performed so as not to exceed the rated value of the optical component connected thereto, but to select as high a value as possible within the limited range so as to improve the signal-to-noise ratio.

Compensation for the variation in optical output power of the entire optical amplifier is also performed by controlling the gain of the back-end optical amplifier, or even by controlling the gains of both of the front-end and back-end optical amplifiers. The gain control in that case is performed by varying a reference voltage to an output constant control circuit provided in the front-end optical amplifier and/or the back-end optical amplifier.

BRIEF DESCRIPTION OF THE DRAWINGS

The present invention will be more clearly understood from the description as set forth below with reference to the accompanying drawings, wherein:

FIG. 14 is a diagram showing a fourth embodiment of an optical amplifier according to the present invention;

FIG. 15 is a diagram showing a fifth embodiment of an optical amplifier according to the present invention;

FIG. 16 is a diagram showing an example of the circuit configuration of a CPU section;

DESCRIPTION OF THE PREFERRED EMBODIMENTS

Figure 4:
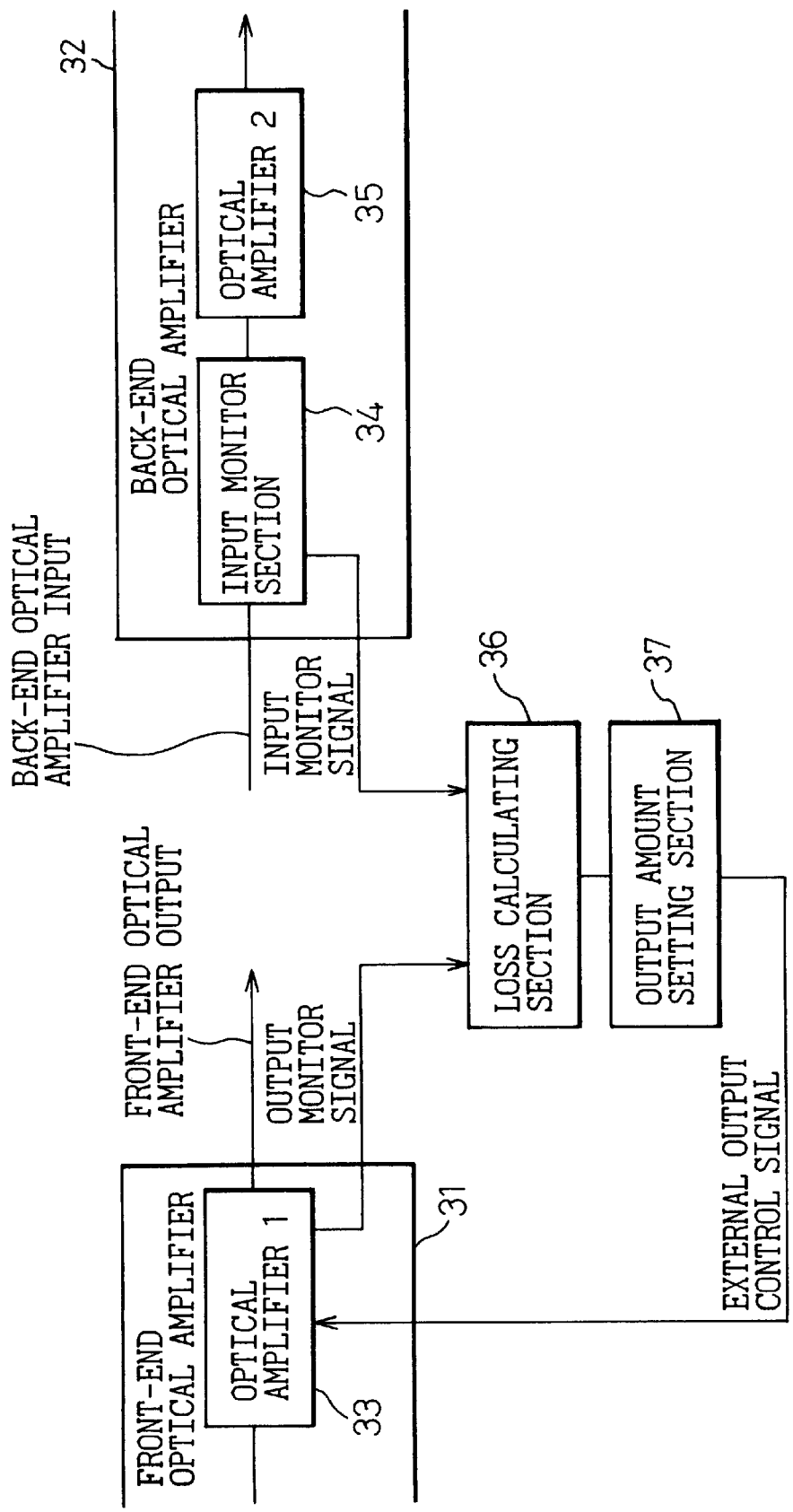
FIG. 4 is a diagram showing a first embodiment of an optical amplifier according to the present invention.

FIG. 4 is a diagram showing a first embodiment of an optical amplifier according to the present invention.

Figure 3:
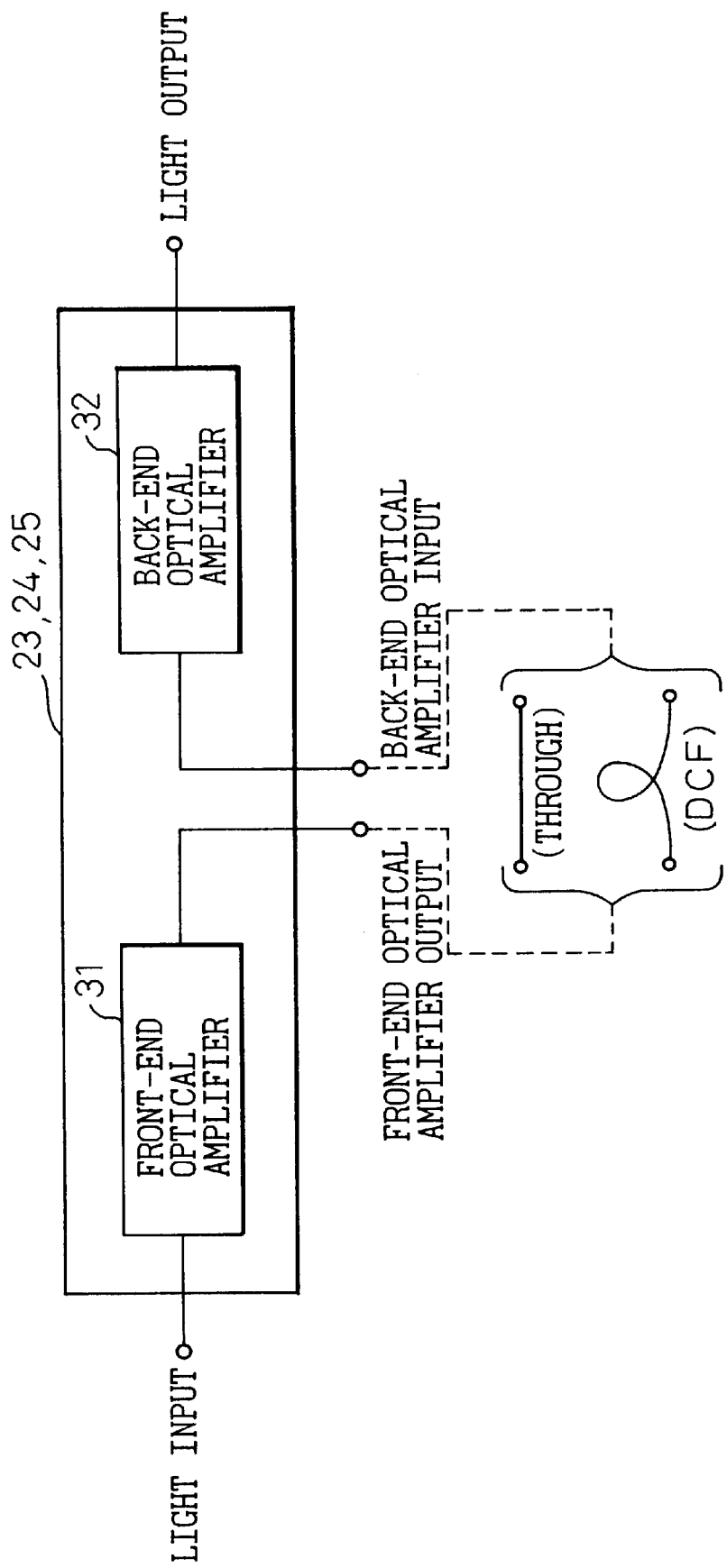
FIG. 3 is a diagram showing an example of the basic configuration of a prior art optical amplifier.

In FIG. 4, the front-end optical amplifier 31 and back-end optical amplifier 32 are the same as those shown in FIG. 3, and contain therein erbium-doped fiber amplifiers 1 and 2

(33 and 35) respectively. According to the present invention, there are also provided: a loss calculating section 36 for receiving an output monitor signal from the front-end optical amplifier 31 and an input monitor signal from the back-end optical amplifier 32, and for detecting the loss that occurred between them (the difference between the output level and the input level); and an output amount setting section 37 for changing the output level of the front-end internal optical amplifier 33 based on the result of the calculation from the loss calculating section 36.

FIGS. 5 to 8 are diagrams showing an example of the basic configuration of the optical amplifier 33 or 35 constructed using an erbium-doped fiber. Within the optical amplifier, optical output automatic level control (ALC) is performed to maintain the optical output of the optical amplifier at a constant level. An optical signal fed into the optical amplifier 33 or 35 is first amplified by an optical amplifying device 41 consisting of an erbium-doped fiber and a pump light source for pumping the erbium-doped fiber, and then output via an optical coupler 42. The optical coupler 42 also redirects a portion of the output signal light to an optical-to-electrical converter 43 which converts it into an electrical signal for output.

The electrical signal is not only supplied to an output controller 44 but also output as the output monitor signal in FIG. 4 to the loss calculating section 36. The output controller 44 compares the thus input monitor signal of the output signal light with a predetermined reference signal corresponding to the desired optical output power level, and performs feedback control by supplying an output control signal to the optical amplifying device 41 to direct it, for example, to increase the optical output when the optical amplifier output is smaller than the desired value.

The optical amplifying device 41 performs amplification in accordance with the output control signal, and the desired constant optical output is thus obtained. Here, if the reference signal is varied, the amount of optical output also varies with the reference signal value, as is apparent from the above-described amplifier operation. The present embodiment actively utilizes this point, and an external output control signal from the output amount setting section 37 in FIG. 4 is supplied as the reference signal or its related signal to the optical amplifier 33.

Figure 6:
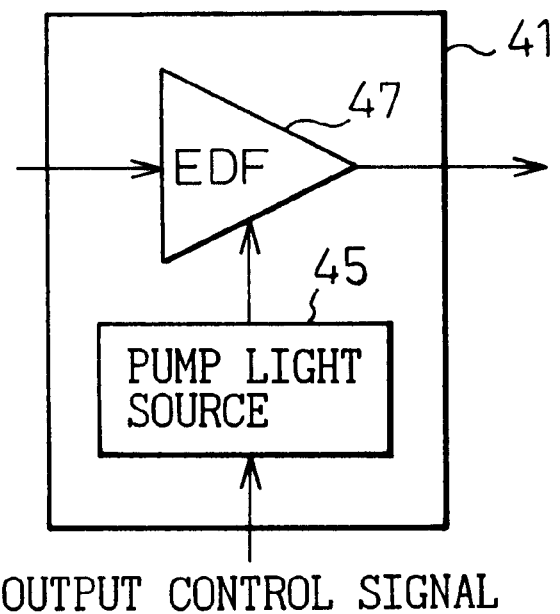
FIG. 6 is a diagram showing an example (1) of the configuration of an optical amplifying device.
Figure 7:
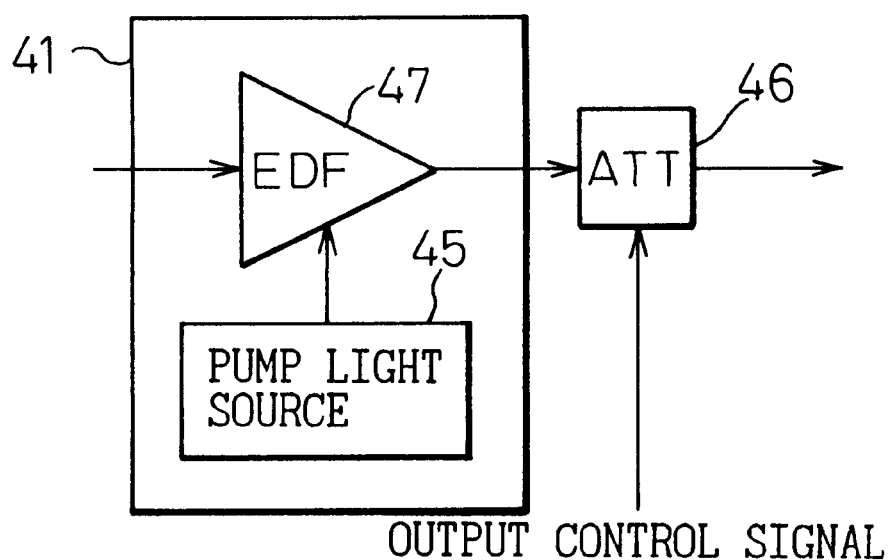
FIG. 7 is a diagram showing an example (2) of the configuration of an optical amplifying device.

FIGS. 6 and 7 are diagrams each showing an example of the detailed configuration of the optical amplifying device 41.

In FIGS. 6 and 7, the optical amplifying device 41 comprises an optical amplifier element constructed from an erbium-doped fiber and an optical combiner for injecting pump light into the amplifier element. The pump light source 45 comprises a semiconductor laser diode (LD) and a control circuit for driving the laser diode. The pump light emitted from the pump light source 45 is injected into the optical amplifier element (EDF) 47 which amplifies the signal light with an amplification ratio (gain) proportional to the amount of the pump light.

FIG. 6 shows the case where the pump light source 45 is controlled by the output control signal from the output controller 44, thereby controlling the output optical level of the optical amplifier element 47. FIG. 7 shows a modified example in which the output of the pump light source 45 is fixed and the output optical level of the optical amplifying device 41 is controlled using an optical attenuator 46 which is variably controlled by the output control signal from the output controller 44. Alternatively, the configurations of FIGS. 6 and 7 may be combined together to control the output optical level of the optical amplifying device 41.

Figure 5:
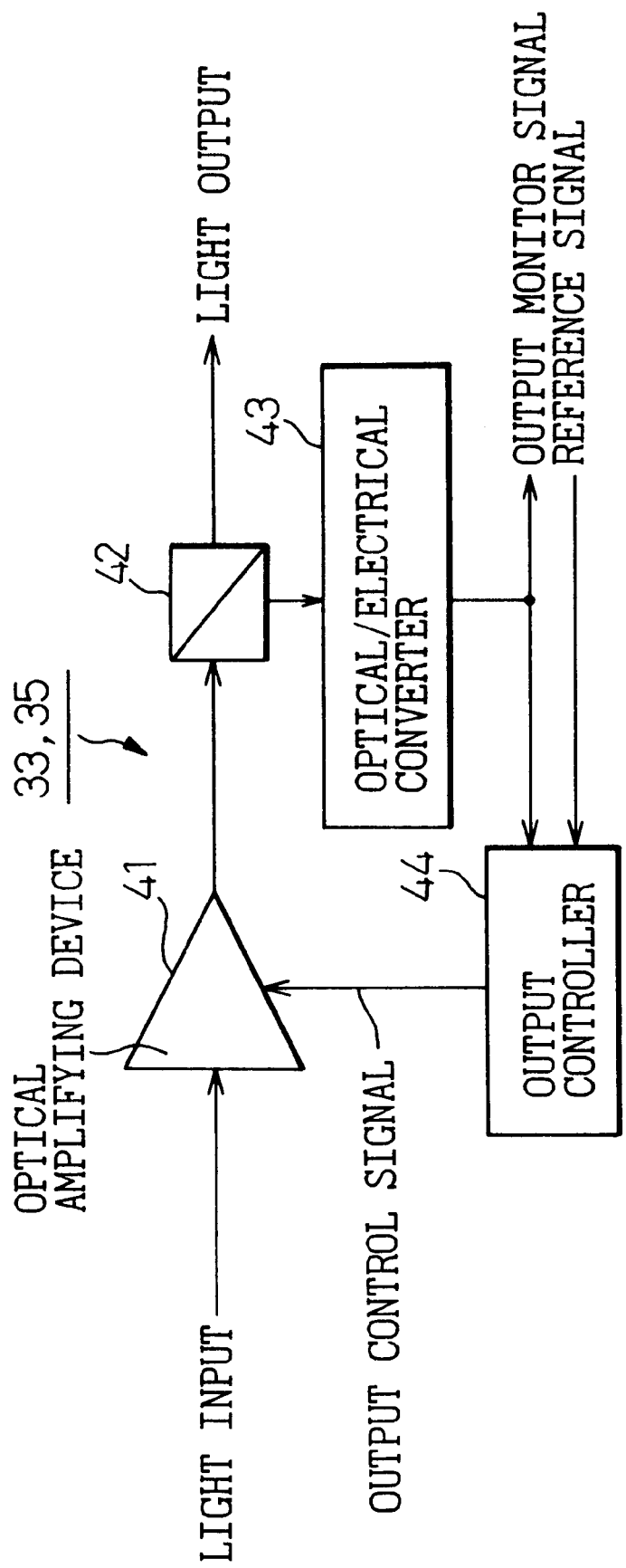
FIG. 5 is a diagram showing an example of the basic configuration of an optical amplifier using an erbium-doped fiber.
Figure 8:
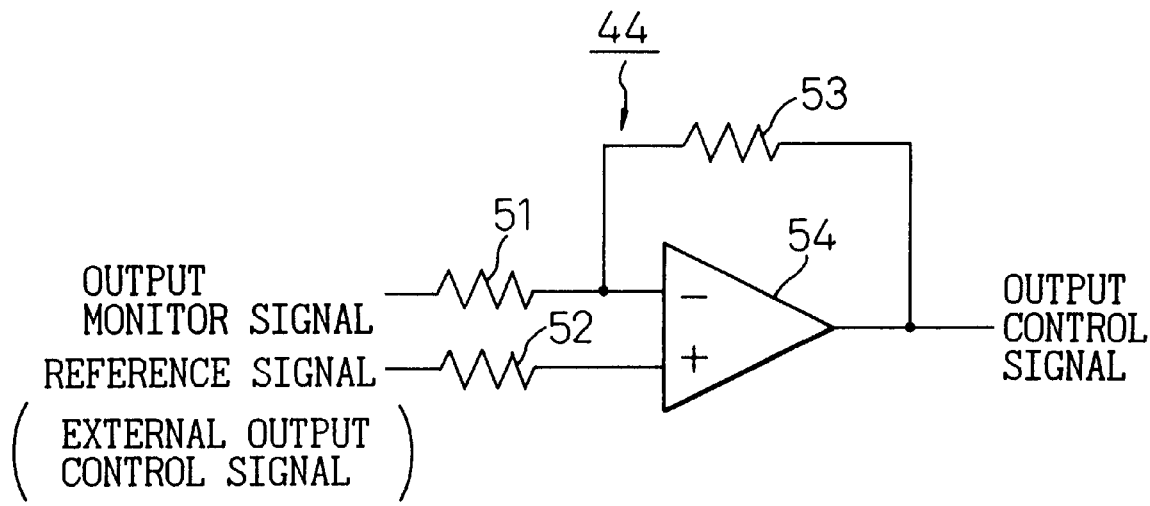
FIG. 8 is a diagram showing an example of the circuit configuration of an output controller.

FIG. 8 shows an example of the circuit configuration of the output controller 44 in FIG. 5.

As shown in FIG. 8, the output controller 44 is configured as a conventional inverting amplifier circuit using an operational amplifier 54, and an inverted differential signal (negative feedback signal) representative of the difference between the output monitor signal as an input signal and the reference signal that provides a reference voltage is output as the output control signal. As earlier described, the external output control signal from the output amount setting section 37 is supplied as the reference signal.

Figure 9:
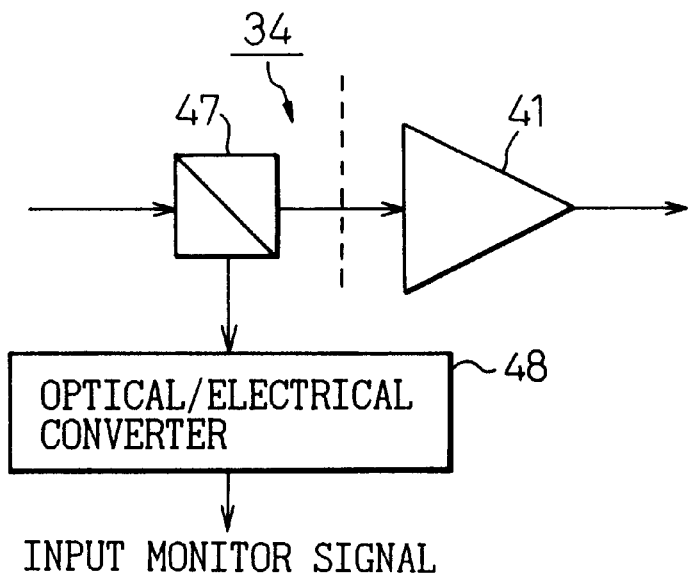
FIG. 9 is a diagram showing an example of the configuration of an input monitor section.

FIG. 9 is a diagram showing an example of the circuit configuration of an input monitor section 34 in FIG. 4.

In FIG. 9, the input signal light is fed via an optical coupler 47 into the optical amplifying device 41 in the back-end optical amplifier 35. The optical coupler 47 also redirects a portion of the input signal light to an optical-to-electrical converter 48. The optical-to-electrical converter 48 outputs an electrical signal proportional to the amount of the input light, which is applied as the input monitor signal to one input of the loss calculating section 36 in FIG. 4.

Figure 10:
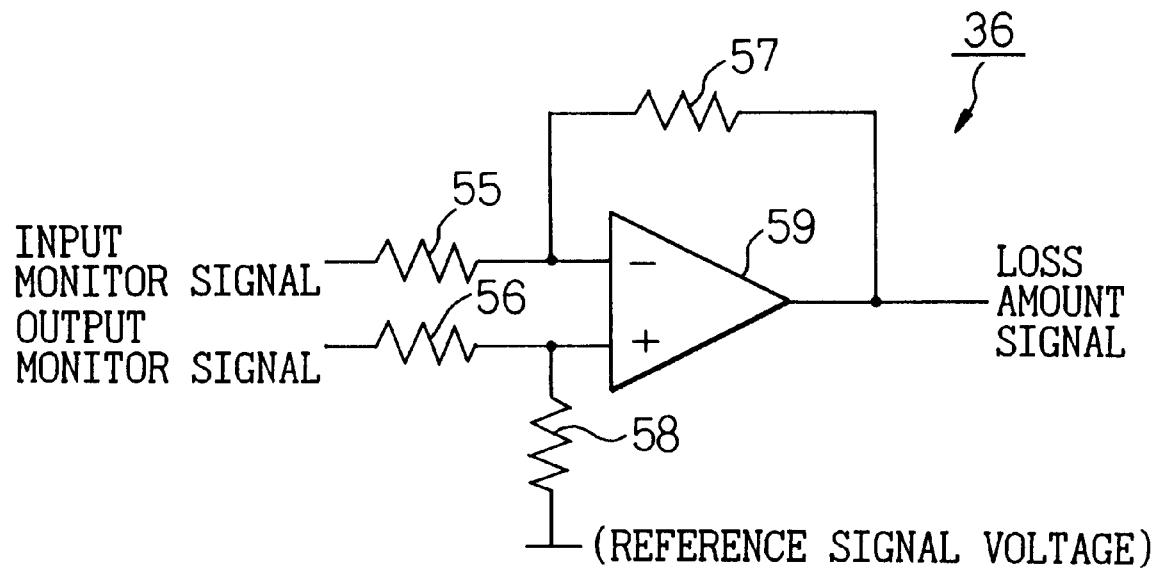
FIG. 10 is a diagram showing an example of the circuit configuration of a loss calculating section.

FIG. 10 is a diagram showing an example of the circuit configuration of the loss calculating section 36 in FIG. 4.

As shown in FIG. 10, the loss calculating section 36 is configured as a conventional differential amplifier circuit using an operational amplifier 59; the input monitor signal is applied to one input thereof and the output monitor signal to the other input. A differential output signal proportional to the difference between the output monitor signal and the input monitor signal is supplied as a loss amount signal to the output amount setting section 37. The reference signal voltage of the optical amplifier (FIG. 5) is applied as the reference voltage to the differential amplifier circuit.

Figure 11:
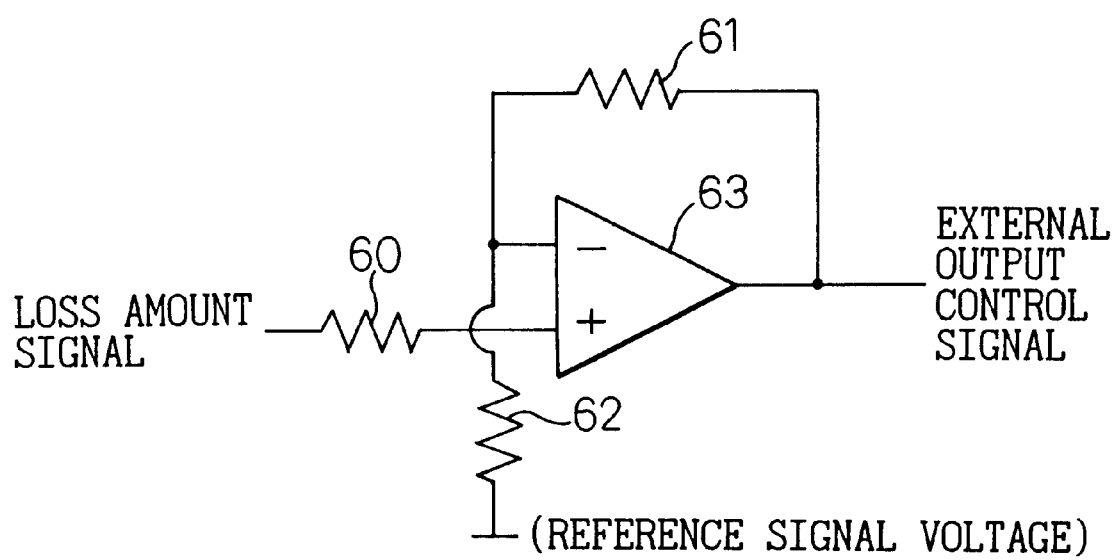
FIG. 11 is a diagram showing an example of the circuit configuration of an output amount setting section.

FIG. 11 is a diagram showing an example of the circuit configuration of the output amount setting section 37 in FIG. 4.

As shown in FIG. 11, the output amount setting section 37 is configured as a conventional amplifier circuit using an operational amplifier 63 (the example shows the case of a positive-phase amplifier circuit). The loss amount signal from the loss calculating section 36 is applied to one input of the amplifier and output as the external output control signal after being amplified with an amplification ratio proportional to the amount of change of the reference signal of the optical amplifier 33 which is thus controlled by the control signal.

In this example also, as in the case of the differential amplifier circuit of FIG. 10, the reference signal voltage of the optical amplifier (FIG. 5) is applied as the reference voltage to the amplifier circuit. Therefore, the external output control signal varies within a range centered about the reference signal and proportional to the loss amount signal. As a result, when the external output control signal is used in place of the reference signal of the optical amplifier, if the loss amount signal is zero (through-connection), the predetermined reference signal voltage is applied, and if the loss amount signal is at a certain value (when a dispersion compensator is installed), a voltage so displaced from the reference voltage as to accurately compensate for the loss amount is applied.

The above embodiment has dealt with the case where the gain of the optical amplifier 33 is controlled linearly in proportion to the loss amount, but the embodiment is not limited to this particular case. For example, though not shown here, the output amount setting section 37 may be constructed using, for example, a comparator, etc. and may be configured so that when a loss amount in excess of a predetermined value is detected, one predetermined reference voltage or one of a plurality of different reference voltages, selected in accordance with the comparator output, is output as the output external output control signal via a selector (analog switch) or the like.

In the latter configuration, the accuracy of loss compensation drops compared with the case of linear control, but instead, there is the advantage that control relating to the front-end optical amplifier, such as the limiting input power to the dispersion compensating fiber and the setting of optimum power in relation to the noise figure, can be performed with great ease.

Figure 12:
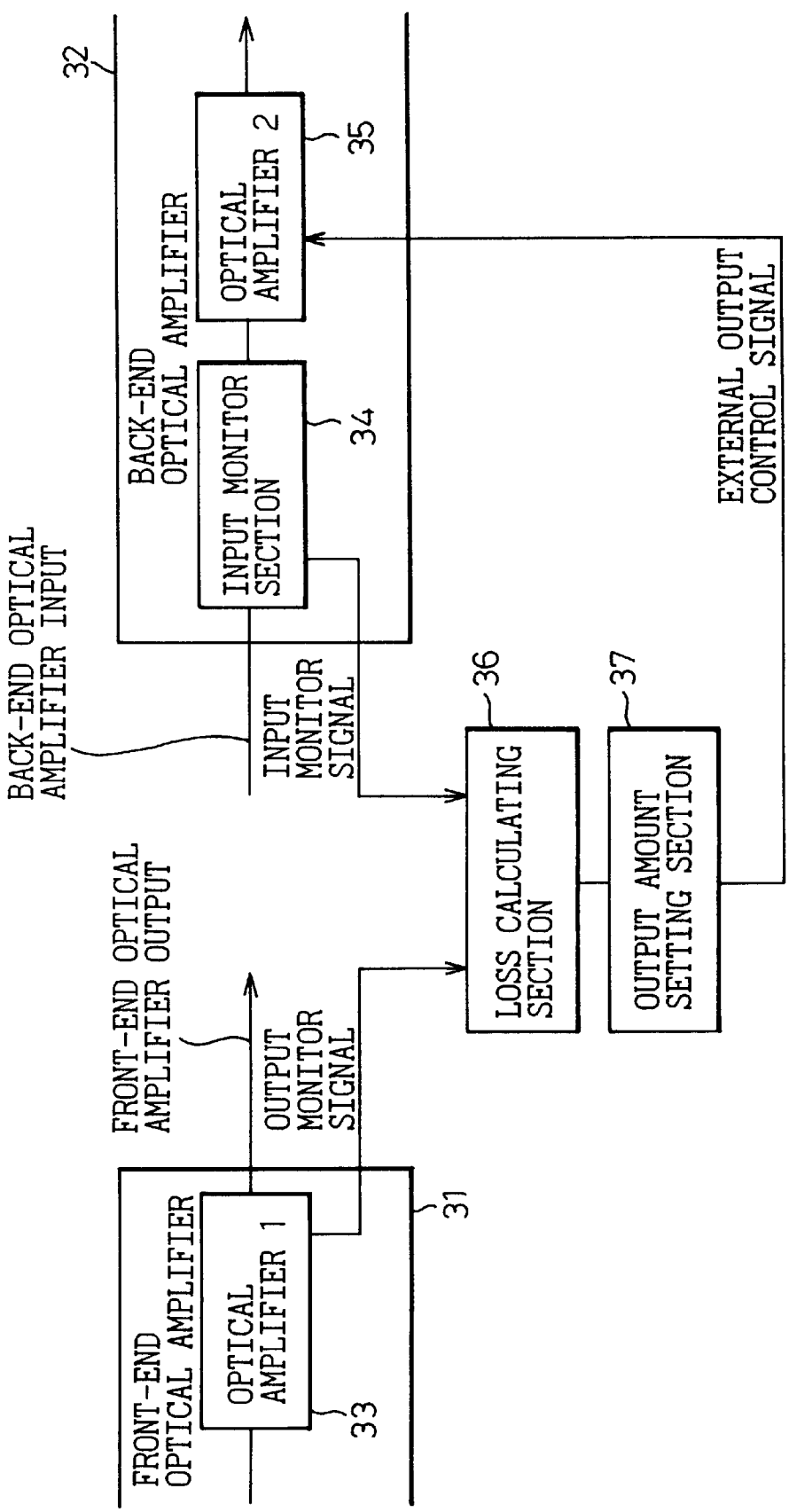
FIG. 12 is a diagram showing a second embodiment of an optical amplifier according to the present invention.
Figure 13:
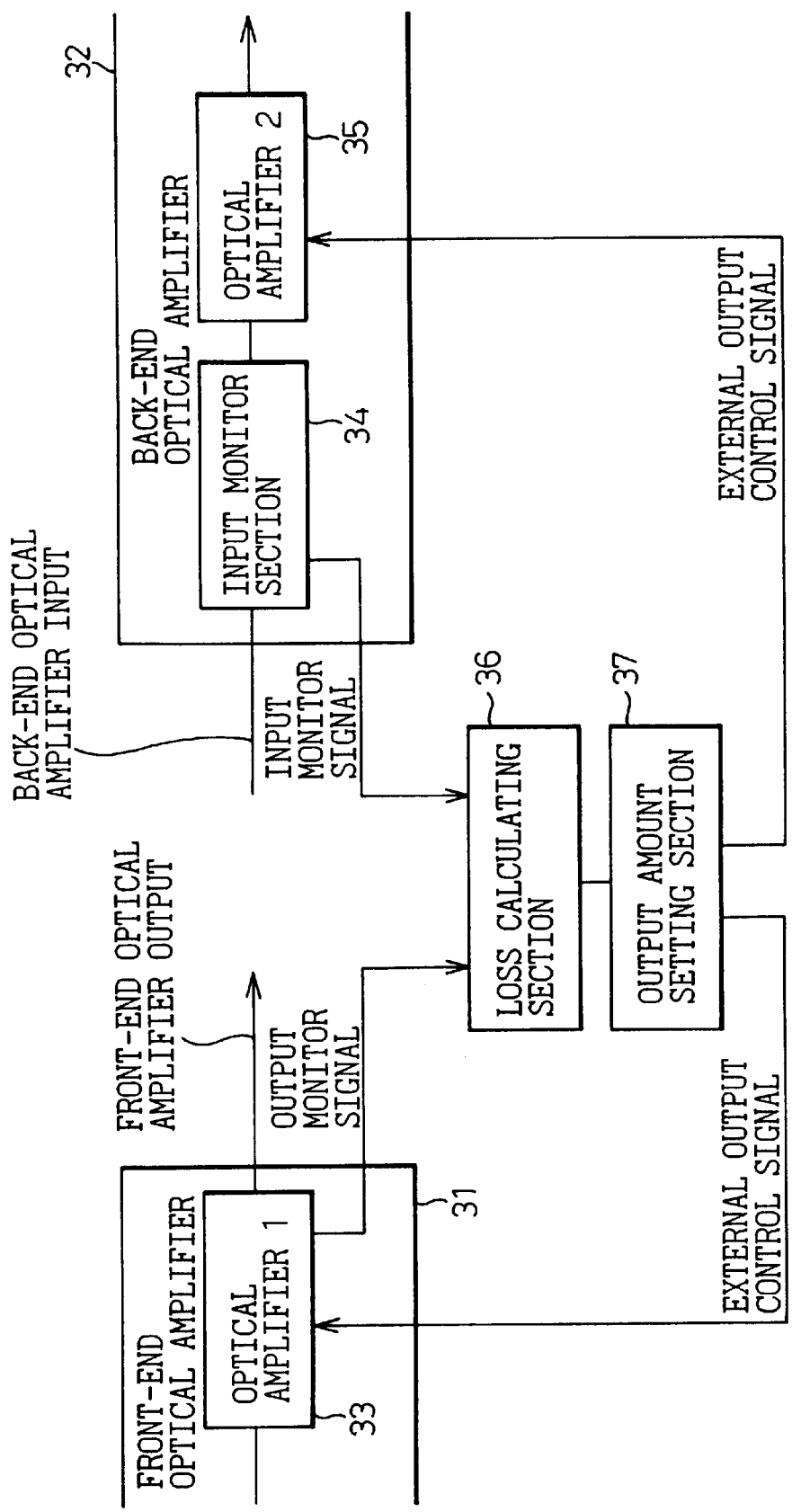
FIG. 13 is a diagram showing a third embodiment of an optical amplifier according to the present invention.

FIGS. 12 and 13 are diagrams showing second and third embodiments of the optical amplifier of the present invention, as variants of the embodiment shown in FIG. 4.

FIG. 12 shows a configuration where the gain of the back-end optical amplifier 35 is controlled, and FIG. 12 concerns a configuration where the gains of both of the front-end and back-end optical amplifiers 33 and 35 are simultaneously controlled.

Figure 1:
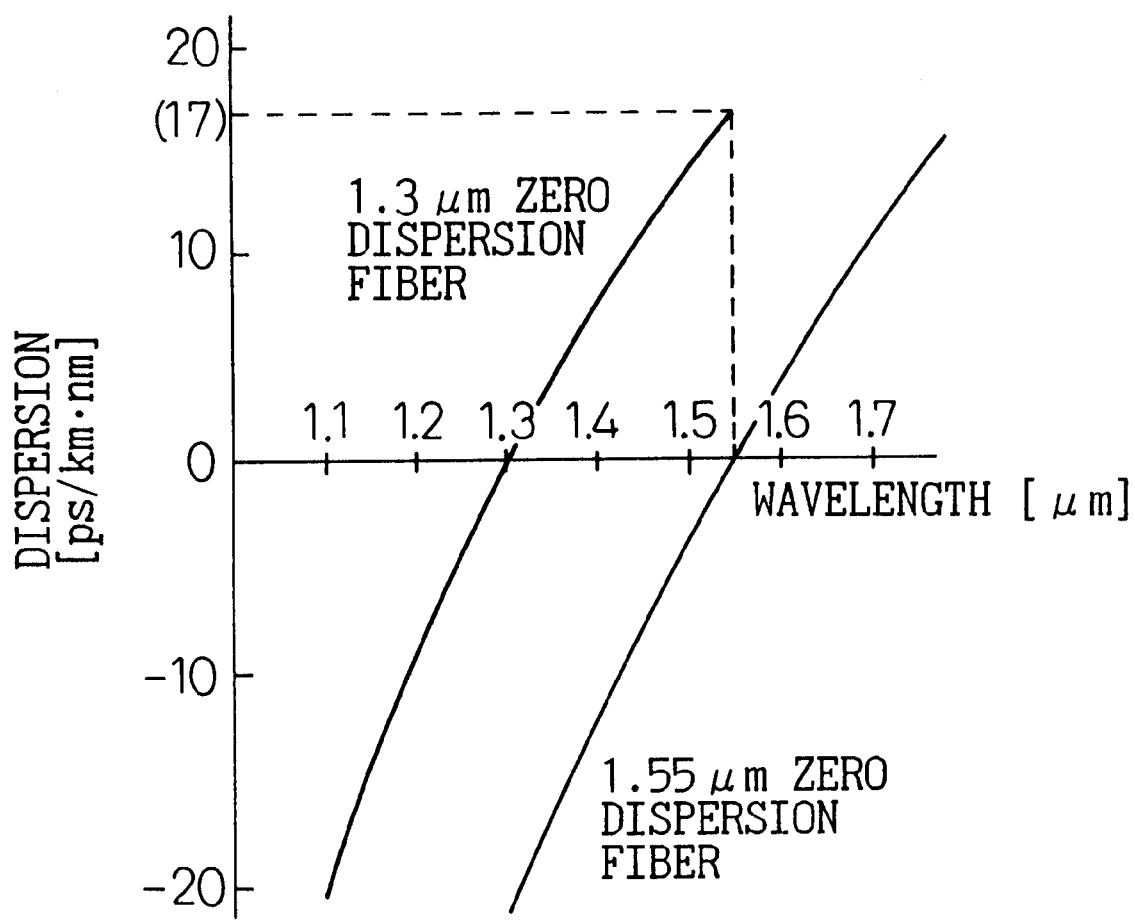
FIG. 1 is a diagram showing examples of optical fiber dispersion characteristics.
Figure 2:
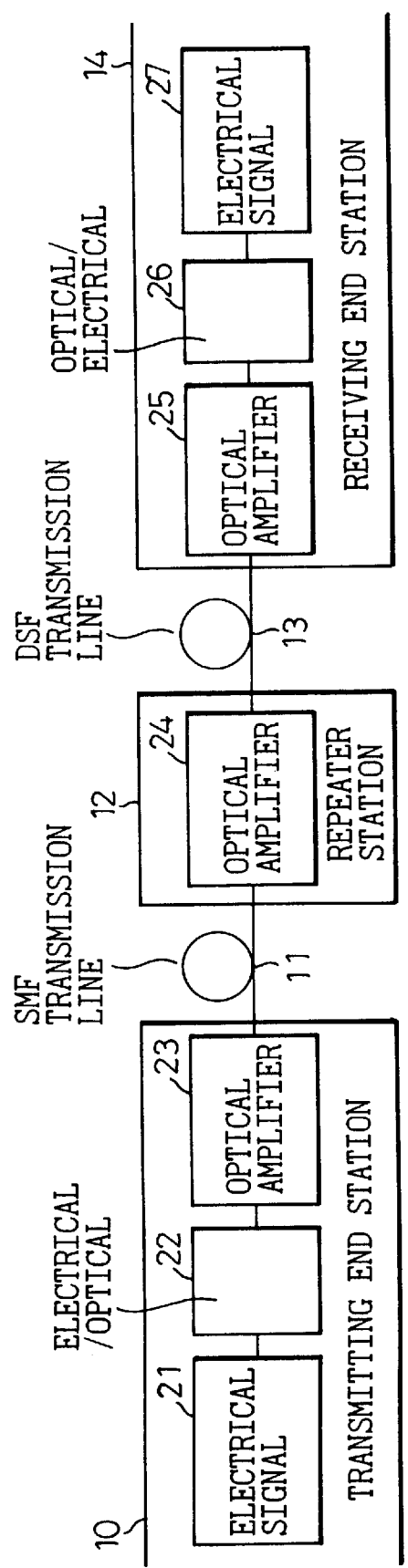
FIG. 2 is a diagram showing one example of an optical transmission system.

In the first embodiment of FIG. 1, while control relating to the front-end optical amplifier, such as the noise figure and the limiting input power to the dispersion compensating fiber, can be performed, the control imposes limitations on the range of amplification. In the second embodiment of FIG. 12, there are no such limitations on the range of amplification, though the above control cannot be performed. On the other hand, in the third embodiment of FIG. 13, all features of the first and second embodiments can be accomplished, but the amount of circuitry increases correspondingly. The circuit configurations implementing the embodiments of FIGS. 12 and 13 are fundamentally the same as the configuration of FIG. 4, and no further explanation will be given here.

FIG. 14 is a diagram showing a fourth embodiment of the optical amplifier of the present invention, as another variant of the embodiment shown in FIG. 4.

In the first embodiment of FIG. 4, the amount of loss was expressed as "Loss Amount=A−B" where A is the front-end output amount and B the back-end input amount. In the fourth embodiment, on the other hand, the output monitor signal from the front-end optical amplifier 31 and the input monitor signal from the back-end optical amplifier 32 are fed to logarithmic amplifiers 38 and 39, respectively.

The logarithmic amplifiers 38 and 39 each produce an output by performing logarithmic conversion of the input signal. The amount of loss in this case can be expressed as "Loss Amount=Ln(A)−Ln(B)=Ln(A/B). Therefore, in this embodiment, the optical amplifier gain can be controlled based on an accurate loss amount expressed in decibels (dB). In other respects, the configuration is the same as that shown in FIG. 4, and no further explanation will be given here.

FIGS. 15 to 19 concern configurations where the analog control circuitry responsible for the optical amplifier gain control of the present invention so far described is replaced by digital control circuitry using a CPU.

FIG. 15 corresponds to FIG. 4, the difference being that the loss calculating section 36 and output amount setting section 37 in FIG. 4 are replaced by a CPU section 71.

FIG. 16 shows an example of the circuit configuration of the CPU section 71 in FIG. 15.

In FIG. 16, the CPU section 71 comprises: analog/digital converters 81 and 82 for accepting the input monitor signal from the back-end optical amplifier 32 and the output monitor signal from the front-end optical amplifier 31 at their respective inputs, and for converting the input signals into digital signals; an arithmetic processor 83 for performing an arithmetic operation; a RAM 84 for storing data during the arithmetic operation; a ROM 85 holding therein a procedure for the arithmetic operation and to output setting data; and a digital/analog converter 86 for converting the result of the arithmetic operation into an analog signal, and for supplying the analog signal as a reference signal to the optical amplifier 33 within the front-end optical amplifier 31.

The arithmetic processor 83 performs subtraction or division between the input monitor signal and output monitor signal converted into digital form, and obtains the amount of the loss that has occurred between them. The ROM 85 contains a loss amount-output setting data conversion table where output setting data corresponding to various loss amounts are stored in advance. Based on the calculated loss amount, the arithmetic processor 83 obtains the corresponding output setting data from the table. The output setting data is converted by the digital/analog converter 86 into an analog signal which is output as the external output control signal.

Figure 17A:
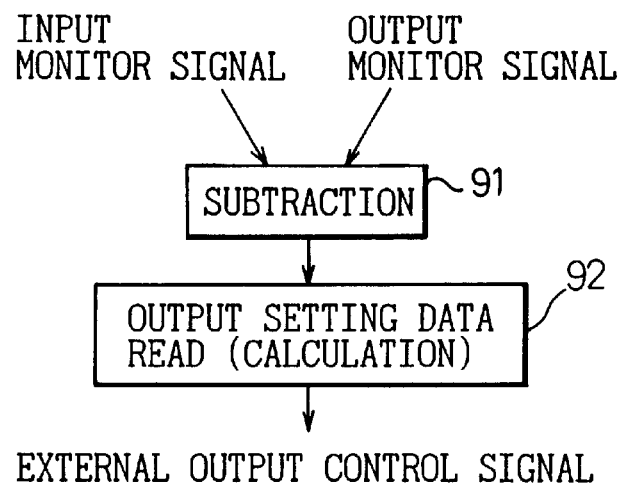
FIG. 17A is a diagram showing an example (1) of the processing performed in the CPU section.
Figure 17B:
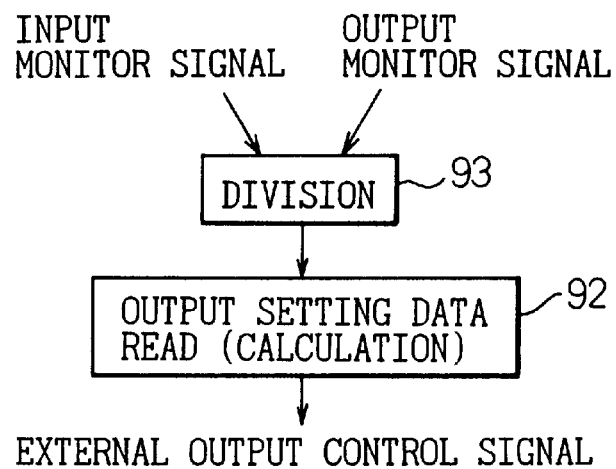
FIG. 17B is a diagram showing an example (2) of the processing performed in the CPU section.
Figure 17C:
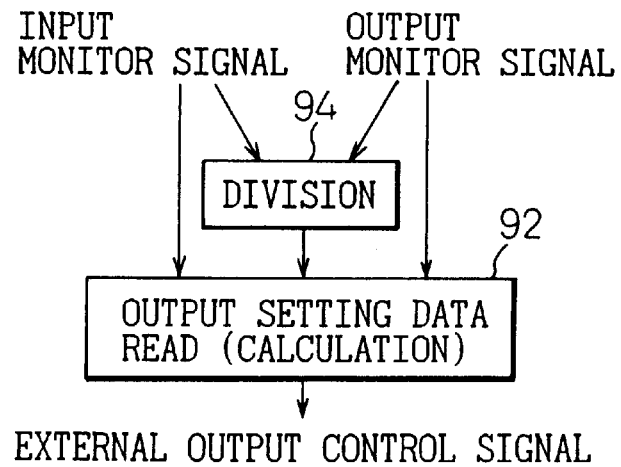
FIG. 17C is a diagram showing an example (3) of the processing performed in the CPU section.

FIGS. 17A to 17C are diagrams illustrating examples of the processing performed in the arithmetic processor 83.

FIG. 17A corresponds to the processing performed in the first embodiment of FIG. 4, wherein subtraction 91 is performed between the input monitor signal and the output monitor signal and, based on the result of the subtraction (the amount of loss), reading 92 is performed to read the corresponding output setting data from the loss amount-output setting data conversion table.

FIG. 17B corresponds to the processing performed in the fourth embodiment of FIG. 14, wherein division 93 is performed between the input monitor signal and the output monitor signal to obtain the amount of loss expressed in decibels (dB), based on which the reading 92 is performed to read the corresponding output setting data from the loss amount-output setting data conversion table.

FIG. 17C also shows an example in which the reading 92 is performed to read the corresponding output setting data from the loss amount-output setting data conversion table by directly using the input monitor signal and output monitor signal as parameters and without performing the subtraction or addition described above. This processing is suitable, for example, for the case where only the input monitor signal from the back-end amplifier is monitored and control is performed to constantly maintain its signal level at a predetermined value irrespective of the presence or absence of a dispersion compensating fiber. The function of the external output control signal after conversion to analog form is the same as that already described.

Figure 18:
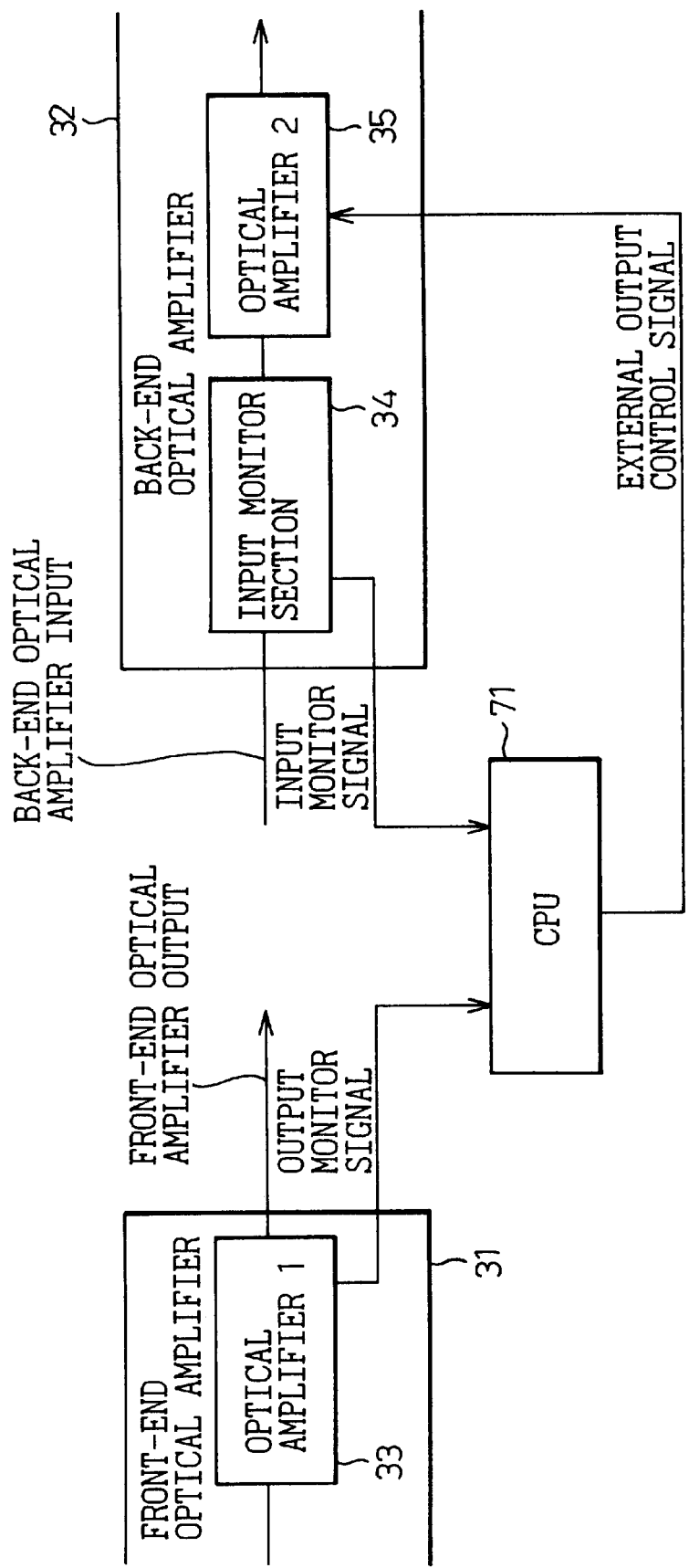
FIG. 18 is a diagram showing a sixth embodiment of an optical amplifier according to the present invention.
Figure 19:
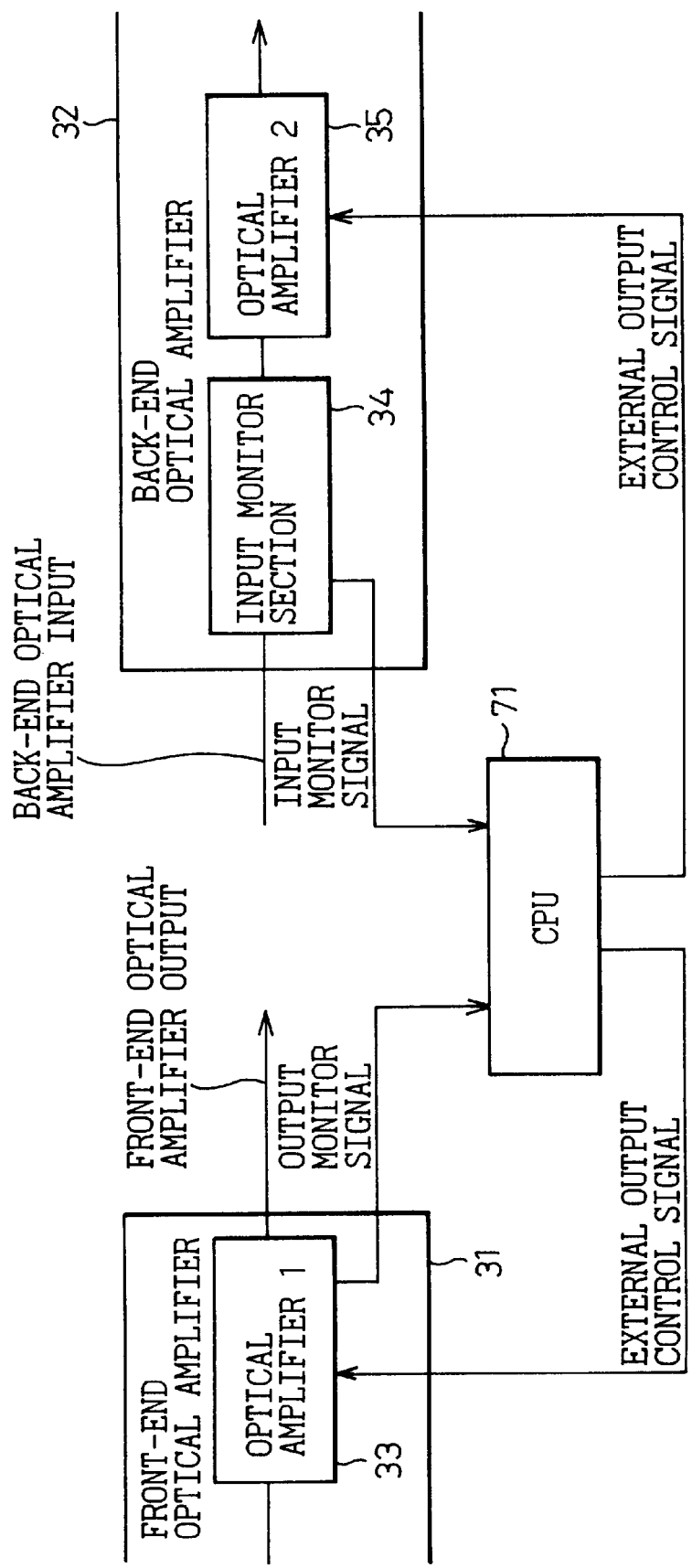
FIG. 19 is a diagram showing a seventh embodiment of an optical amplifier according to the present invention.

FIGS. 18 and 19 are diagrams showing configurations corresponding to the second embodiment of FIG. 12 and the third embodiment of FIG. 13, respectively. Their operation is obvious from the description so far given, and does not need further explanation. The CPU section 71 is thus capable of performing processing equivalent to the analog processing; accordingly, an optical amplifier can be constructed that can flexibly accommodate various situations (such as the limiting input power to the dispersion compensating fiber and the control of the noise figure, etc.) by appropriately setting the arithmetic operation and the loss amount-output setting data conversion table.

As described above, according to the present invention, there is provided an optical amplifier wherein the optical output power of the entire optical amplifier is constantly maintained at a predetermined level by means of an automatic compensation function which automatically detects and compensates for signal light loss caused by a dispersion compensator inserted between the front-end and back-end amplifiers. Accordingly, the same kind of amplifier can be used as is without requiring level adjustments, etc. regardless of whether it is used in a 1.3 $\mu$m zero dispersion fiber segment or a 1.55 $\mu$m zero dispersion fiber segment.

Furthermore, according to the present invention, when changing the output power by means of the automatic loss compensation function, an optimum power setting can be made by considering both the noise figure and the limiting input power to the dispersion compensating fiber. Accordingly, a stable and low-noise optical amplifier can be provided regardless of whether it is used in a 1.3 $\mu$m zero dispersion fiber segment or a 1.55 $\mu$m zero dispersion fiber segment.

Moreover, according to the present invention, the optical amplifier of the present invention is applicable not only for use with a dispersion compensating fiber but also for use with other dispersion compensating elements having similar characteristics.

What is claimed is:

1. An optical amplifier having a front-end optical amplifier and a back-end optical amplifier, comprising:

loss detection means for detecting optical signal loss occurring between said front-end optical amplifier and said back-end optical amplifier; and gain control means for compensating, based on the loss detected by said loss detection means, for a variation in optical output power of the entire optical amplifier including said front-end optical amplifier and said back-end optical amplifier, wherein compensation for the variation in optical output power of said entire optical amplifier is performed by controlling a gain of said front-end optical amplifier.

2. An optical amplifier according to claim 1, wherein said optical signal loss occurs due to the insertion of a dispersion compensator.

3. An optical amplifier according to claim 2, wherein said dispersion compensator is a dispersion compensating fiber.

4. An optical amplifier according to claim 1, wherein the gain of said front-end optical amplifier is controlled so as not to exceed a rated value of an optical component connected thereto.

5. An optical amplifier according to claim 1, wherein the gain of said front-end optical amplifier is controlled so as to improve a signal-to-noise ratio.

6. An optical amplifier having a front-end optical amplifier and a back-end optical amplifier, comprising:

loss detection means for detecting optical signal loss occurring between said front-end optical amplifier and said back-end optical amplifier; and gain control means for compensating, based on the loss detected by said loss detection means, for a variation in optical output power of the entire optical amplifier including said front-end optical amplifier and said back-end optical amplifier, wherein compensation for the variation in optical output power of said entire optical amplifier is performed by controlling gains of both of said back-end optical amplifier and said front-end optical amplifier.

7. An optical amplifier comprising:

a front-end optical amplifier;

a back-end optical amplifier;

a loss calculating section for taking as inputs an output monitor signal from said front-end optical amplifier and an input monitor signal from said back-end optical amplifier, and for calculating from said output monitor signal and said input monitor signal a signal loss occurring therebetween; and an output amount setting section for variably setting the gain of said front-end optical amplifier and/or said back-end optical amplifier, based on the result of the loss calculation from said loss calculating section, wherein a variation in optical output power of the entire optical amplifier including said front-end optical amplifier and said back-end optical amplifier is compensated for by said gain setting from said output amount setting section.

8. An optical amplifier according to claim 7, further comprising logarithmic amplifiers for applying logarithmic conversion to the output monitor signal from said front-end optical amplifier and the input monitor signal from said back-end optical amplifier, respectively, and for supplying the resulting signals to said loss calculating section.

9. An optical amplifier according to claim 7, wherein said gain setting is made by way of a reference voltage applied to an output constant control circuit provided in said front-end optical amplifier and/or said back-end optical amplifier.

10. An optical amplifier according to claim 8, wherein said gain setting is made by way of a reference voltage applied to an output constant control circuit provided in said front-end optical amplifier and/or said back-end optical amplifier.

11. An optical amplifier according to claim 7, wherein said loss calculating section and said output amount setting section are constructed by CPU circuitry.

12. An optical amplifier according to claim 6, wherein said optical signal loss occurs due to the insertion of a dispersion compensator.

13. An optical amplifier according to claim 12, wherein said dispersion compensator is a dispersion compensating fiber.

14. An optical amplifier according to claim 6, wherein the gain of said front-end optical amplifier is controlled so as not to exceed a rated value of an optical component connected thereto.

15. An optical amplifier according to claim 6, wherein the gain of said front-end optical amplifier is controlled so as to improve a signal-to-noise ratio.

* * * * *